G. E. RHODES.
SAW SHARPENING MACHINE.
APPLICATION FILED FEB. 13, 1914.
1,137,664.
Patented Apr. 27, 1915.
2 SHEETS—SHEET 2.
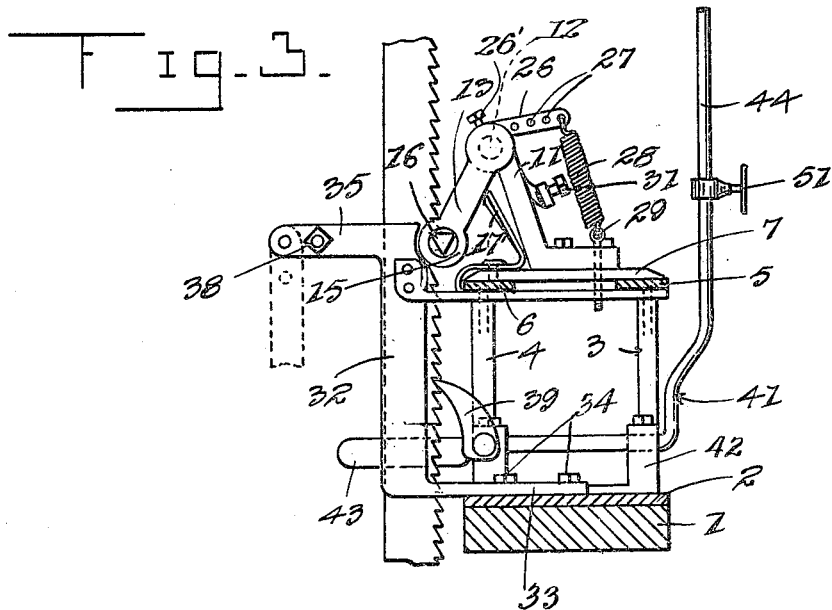
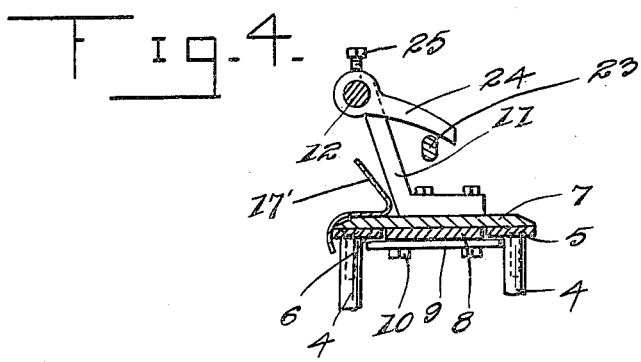

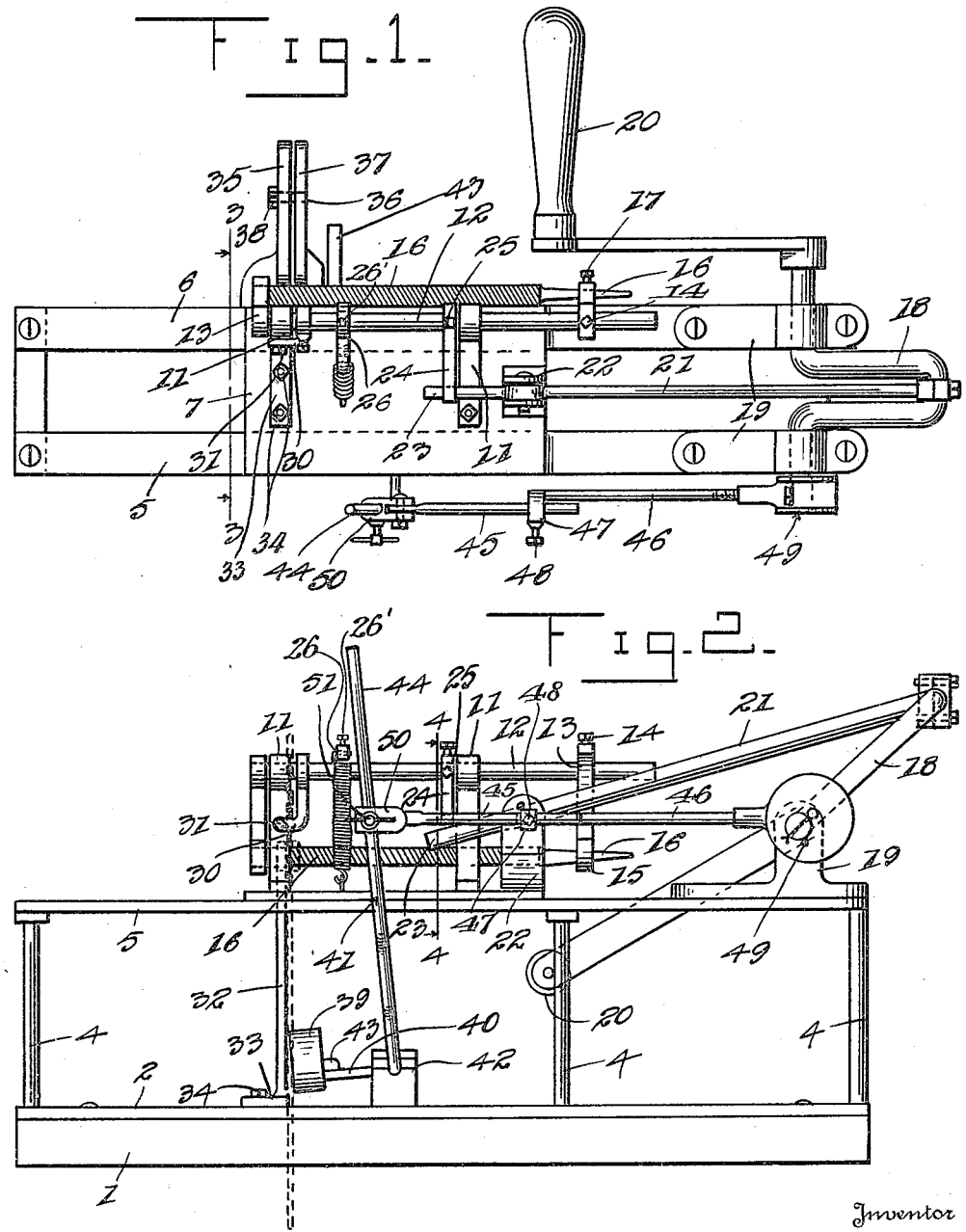

UNITED STATES PATENT OFFICE.

GEORGE E. RHODES, OF JACKSONVILLE, FLORIDA, ASSIGNOR OF ONE-HALF TO ELBRIDGE L. RHODES, OF WHITEHOUSE, FLORIDA.

SAW-SHARPENING MACHINE.

1,137,664.  Specification of Letters Patent.  Patented Apr. 27, 1915.

Application filed February 13, 1914. Serial No. 818,512.

*To all whom it may concern:*

Be it known that I, GEORGE E. RHODES, a citizen of the United States, residing at Jacksonville, in the county of Duval and State of Florida, have invented certain new and useful Improvements in Saw-Sharpening Machines; and I do hereby declare the following to be a full, clear, and exact description of the invention, such as will enable others skilled in the art to which it appertains to make and use the same.

My invention relates to new and useful improvements in saw sharpening machines and resides in the provision of a device of the character described which will operate to file and sharpen the teeth of a saw in a reliable and expeditious manner.

An important object of my invention is to provide a saw sharpening machine of the character described which will automatically feed the saw so that the different teeth thereof are moved into a position to be engaged by the filing or sharpening member, upon the rotation of a crank handle.

Another important object of my invention is to provide a simple and inexpensive machine of the character described which will operate in a reliable and expeditious manner to sharpen the teeth of a saw, said operation being automatic, requiring only the setting of the saw in a clamp and the turning of a crank handle.

Another important object of my invention is to provide means for moving the saw after one of the teeth has been sharpened so that the next tooth is in a position to be sharpened, said action being automatically brought about by the turning of a crank shaft.

A still further object of my invention is to provide a saw sharpening machine of the character described which is simple as to construction, reliable and efficient in operation, not liable to derangement and cheap to manufacture.

The above and additional objects are accomplished by such means as are illustrated in the accompanying drawings, described in the following specification and then more particularly pointed out in the claim which is appended hereto and forms a part of this application.

With reference to the drawings, wherein I have illustrated the preferred embodiment of my invention as it is reduced to practice, and throughout the several views of which similar reference numerals designate corresponding parts: Figure 1 is a top plan view of my device showing it as it would appear when in assembled position. Fig. 2 is a side elevation. Fig. 3 is a cross sectional view taken on line 3—3 of Fig. 1 and showing a saw in position relative to the machine, and Fig. 4 is a sectional view taken on line 4—4 of Fig. 2 showing the arrangement for moving the file out of engagement with the saw upon the return movement of the file which reciprocates.

Referring to the drawings by characters of reference the numeral 1 designates a base board upon which is secured the base plate 2 of a frame designated 3 as an entirety. The frame 3 consists of a plurality of vertical standards or posts 4 upon the upper ends of which are mounted spaced longitudinal bars 5 and 6. The bars 5 and 6 serve as tracks for the sharpening mechanism to be later described.

The sharpening mechanism consists of an approximately rectangular slide plate 7 that is provided upon its under face with a longitudinal guide plate or bar 8. This guide plate or bar 8 is fitted between the bars 5 and 6 in engagement with the inner longitudinal edges of the bars 5 and 6. A transverse bar 9 is secured centrally of the ends of the bar 8 and has its free ends disposed in overlapping engagement with relation to the inner edges of the bars 5 and 6.

The bar 9 is secured by suitable fastening 10 turned upon the plate 8 and serves to prevent accidental derangement of the slide plate 7 as will be clearly seen with reference to Fig. 4 in the drawings. An angular upstanding bearing 11 is secured adjacent to each end of the plate 7 and supports a shaft 12. The shaft 12 is arranged longitudinally with relation to the plate 7 in superposed relation to one longitudinal edge thereof and has secured thereon a pair of file holding arms 13. The arms 13 are provided with apertures adjacent to each end thereof. The apertures at one end receive the shaft 12. A set screw 14 is provided at the inner ends of the arms 13 to provide for the angular disposal of the arms with relation to the plate 7 and shaft 12. The arms 13 are arranged adjacent to the ends of the shaft 12 and project outwardly and downwardly therefrom. The outer or lower ends of the arms 13 are enlarged and apertured as at 15 to receive the ends of a file 16. Set screws 17 are turned in the enlarged apertured portions 15 and adapted to engage the ends of the file 16 to hold the file in secured position. The file 16 serves as a sharpening element. The slide plate 7 carrying the file holding arms and file is adapted to be reciprocated upon the frame 3 so that the file may engage and sharpen the teeth of a saw.

As a means for reciprocating the plate 7, I provide a crank shaft 18 having its ends journaled in a pair of upstanding bearings 19 that are mounted upon the bars 4 and 5. One end of the shaft 18 is extended through one of the bearings 19 and has secured thereon a crank handle 20. A connecting rod 21 is operatively connected at one end to the crank shaft 18 and pivoted adjacent but in spaced relation to the other end between the sides of an upstanding bifurcated bearing 22. The bearing 22 is carried upon the upper face of the plate 7 adjacent to one end thereof. The connecting rod 21 is extended beyond the pivot point and forms an extension 23 which is for a purpose to be later described. It will be readily seen that upon the turning of the crank handle 20 the plate 7 and parts thereon will be moved back and forth upon the bars 4 and 5 of the frame 3.

A trip arm 24 is secured at one end to the intermediate portion of the shaft 12 and extending outwardly from the shaft in a plane approximately parallel with the plate 7 normally, is designed to coöperate with the extension 23 of the rod 21. A set screw 25 is carried by the trip arm 24 and serves to permit adjustment of the arm relative to the shaft 12. The free end of the arm 24 extends outwardly over and beyond the extension 23 at a point spaced from the end of the extension. An arm 26 is secured at one terminal upon the shaft 12 at a point suitably spaced from the arm 24 and is adjustable by means of a set screw 26′ after the same manner as the arm 24. A plurality of openings 27 disposed in spaced relation to each other are formed in the arm 26. One end of a helical retractile spring 28 is secured within certain of the openings 27 and the other end suitably secured as at 29 to the plate 7. The arm 26 is disposed in such a way that the spring action holds the file 16 in an outward position relative to the plate 7 so that the teeth of the saw may be engaged when the plate 7 is moved forwardly upon the frame 3. The plurality of openings 27 provided enable the adjustment of the tension of the spring 28. It will be readily seen that upon the return movement of the plate after a forward movement the extension 23 trips the under face of the tripper arm 24. As the arm 24 is held against rotation upon the shaft 12 by means of the set screw 25, the shaft 12 is turned against the action of the spring 28 and so that the file 16 is moved out of engagement with the teeth of the saw.

After the extension 23 is moved out of tripping engagement with the tripper arm 24, the spring 28 serves to return the file 16 to a position whereby the file will engage the teeth when the plate 7 is moved forwardly. The reciprocation of the plate as will be readily observed is brought about by means of the crank shaft 18 and crank handle 20 connected with the plate by the rod 21. It will be readily seen that the file 16 is moved into and out of engagement with the teeth when the plate 7 is moved back and forward.

As a means for limiting the outward movement of the file 16 relative to the plate 7, I provide an angular stop arm 30 that is secured to the shaft 12 after the same manner as the arms 24 and 26. The angular portion of the arm 30 is provided with a set screw 31 and is disposed to engage the adjacent bearing 11 upon the rear face or edge thereof. The set screw 31 may be turned so that the outward movement of the file 16 is limited. The end of the set screw 31 engages the rear face or edge of the adjacent standard 11 and as the arm 30 is secured against rotation upon the shaft 12 the rotary movement of the shaft 12 is limited and the file is held against further outward movement. It will be readily seen that the outward movement of the file may be regulated by means of the screw 31 carried by the angular stopper arm 30.

As a means for holding the saw blade in the proper position so that the file 16 will be moved into and out of engagement therewith, I provide a guide bar or plate 32 that is disposed vertically with relation to the frame 3 upon one side thereof and provided with a lateral extension 33 through which suitable fastening means 34 is inserted for the purpose of securing the plate 32 in the proper position relative to the frame 3. The upper end of this guide plate 32 is provided with a lateral extension 35 through which is pivoted as at 36 a clamping plate 37. A wing nut 38 turned upon the pivot pin for the pivoted clamping plate 37 provides for the clamping of the saw blade between the extension 35 and plate 37. The extension 35 and plate 37 are disposed adjacent to the normal position of the file 16 that is, in approximately the same plane as the normal position of the file. The saw blade is disposed with its one face in engagement with the plate or bar 32 and extends between the extension 35 and plate 37 as clearly shown in Fig. 3 in the drawings. The saw blade is secured so that its adjustment is permitted relative to the extension 35 of the plate 37. It is preferable to dispose the clamping means for the saw blade in such a position that the full sweep or length of the file 16 will engage the tooth being sharpened. It will thus be seen that a saw blade when positioned as shown in Fig. 3 in the drawings and the crank handle 20 rotated, the file will be moved into engagement with one of the teeth on the saw blade upon the forward movement of the plate 7 and will be moved out of engagement or away from the saw blade when the plate 7 is returned to its normal position. When the plate returns to its normal position after moving the file into engagement with one of the teeth, the saw blade is fed or advanced in such a way that the next lowest tooth in the blade is positioned to be sharpened by the file 16.

As a means for feeding or moving the saw blade so that the teeth thereof are disposed for engagement with the file, I provide feeding mechanism which consists of a lifting or feeding pawl 39. This pawl 39 is pivoted upon the extension portion 40 of an operating arm 41. The operating arm 41 is journaled intermediate its ends in a U-shaped bearing member 42 and is formed angularly. The arm 41 is so formed that when moved back and forth the pawl 39 is moved into and out of engagement with the teeth of the saw blade. The pawl 39 carries a right angular extension 43 that is disposed at right angles to the saw blade when the saw blade is in the proper position, outwardly from the pivot for the pawl 39. The weight of the extension 43 serves to normally hold the pawl in a position for engagement with the teeth of the saw blade. The arm 41 is provided with a vertical portion 44 that is adapted to be oscillated to lift and lower the pawl 39 to bring about the feeding of the saw blade.

As a means for oscillating the vertical portion 44 of the arm 41 I provide a pair of connecting rods 45 and 46. The arm 46 carries at one end a lateral apertured extension 47 which receives one end of the rod 45. A set screw 48 is provided for the extension 47 and serves to secure the arms to each other in adjusted position. The arm 46 is connected at its outer end with eccentric mechanism of some suitable type designated 49. This eccentric mechanism connects the arm 46 with the adjacent end of the crank shaft 18, that is, the end opposite to that which carries the crank handle 20.

An angular guard plate 17' is carried on the longitudinal edge of the plate 7 and adjacent to the file 16. This guard plate 17' serves to catch the filings. A link 50 connects the rod 45 with the vertical portion 44 of the arm 41. This link 50 is provided with an apertured portion which receives the vertical portion 44 of the arm 41 and is pivoted to the adjacent end of the rod 45. A set screw 51 is carried adjacent the apertured portion of the link 50 and serves to hold the link in adjusted secured position upon the vertical portion 44 of the arm 41. When the crank shaft 18 is turned the arm 41 is oscillated through the medium of the connecting rods 45 and 46 and eccentric mechanism 49 which is connected with one end of the shaft 18. The portion 40 of the arm 41 is disposed at right angles to the arm and is lifted upwardly and downwardly according to the movement of the arm 41. The extension 43 carried by the pawl 39 serves to hold the pawl normally in a position whereby the pawl will engage the teeth. The extension 40 of the arm 41 is disposed in a plane parallel to the longitudinal axis of the frame 3, while the pawl 39 is disposed at right angles to the extension 40 and in a position where it will readily engage the teeth of the saw blade as clearly shown in Fig. 3 of the drawings.

The rearward movement of the arm 41 with respect to the crank shaft 18 lifts the pawl upwardly and advances the saw blade so that the next tooth is in a position to be filed by the file 16. This action is provided when the file 16 has been drawn to its normal or starting position.

In operation, the saw blade is positioned after the manner described with relation to the device and when the shaft 18 is rotated the file is moved into engagement with the tooth that is disposed for operation by the file. When the plate 7 begins to return to its normal position, the eccentric mechanism 49 operates so that the arm 41 will be drawn rearwardly toward the crank shaft 18. When this takes place the pawl 39 forces the saw blade so that another tooth is positioned for filing. The return movement of the plate 7 also causes the file to be moved out of engagement or away from the saw blade after the manner described.

It will be noted with reference to the foregoing description and accompanying drawings, that I have provided a saw sharpening machine which will operate in a reliable and expeditious manner to sharpen the teeth of the saw and accomplish all the functions hereinbefore recited.

The device is a great labor saving one in that the saw is automatically fed so that the teeth are all sharpened without necessitating manual positioning of the saw blade.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

What is claimed is:—

A saw sharpening machine, comprising a support, a sharpening element reciprocally mounted on said support, a saw holding means carried by said support, means for holding saws therein, a crank shaft carried by said support, a connecting rod pivotally attached to said sharpening element and at its free terminal to said crank shaft, means for rotating said crank shaft thereon, an arm eccentrically mounted on one end of said shaft, an apertured extension mounted on one end of said arm, a second rod placed through said aperture and firmly held by a set screw placed therein, said second rod being provided at its other terminal with an adjustable link, said link connecting said arm to a vertical shaft, a set screw carried by said link to hold the shaft in an adjusted position, said shaft having a pawl mounted on its lower end to adjust and regulate the position of the saw teeth.

In testimony whereof I affix my signature in presence of two witnesses.

GEORGE E. RHODES.

Witnesses:
ALBERT W. HANNY,
W. W. DREATUR.

Copies of this patent may be obtained for five cents each, by addressing the "Commissioner of Patents, Washington, D. C."